Patented Dec. 26, 1939

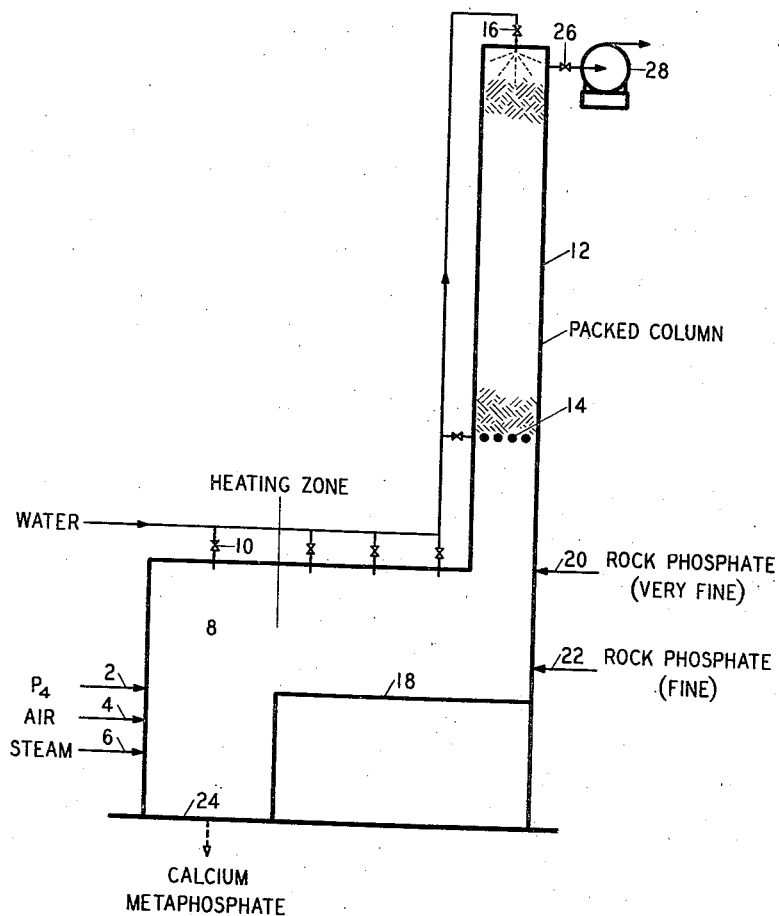

2,184,287

UNITED STATES PATENT OFFICE 2,184,287

MAKING CALCIUM METAPHOSPHATE

Harry A. Curtis, Knoxville, Tenn.

Application February 26, 1938, Serial No. 192,741

14 Claims. (Cl. 23—108)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of making calcium metaphosphate.

One of the objects of this invention is to provide a method for making calcium metaphosphate suitable for use as a plant food. Another object of this invention is to provide a method for making calcium metaphosphate which involves the use of reaction temperatures substantially lower than those hitherto proposed. Still another object of this invention is to provide a method for the production of calcium metaphosphate which will materially reduce the deterioration of the refractory elements required in the construction of certain parts of the apparatus used for its manufacture. A further object of this invention is to provide a method for the removal of halogens from rock phosphate. Other objects of this invention include the provision for a method of making calcium metaphosphate directly from a calcium containing material, reactive with metaphosphoric acid to form calcium metaphosphate, and metaphosphoric acid and the provision of a method for the recovery of that portion of the metaphosphoric acid which does not react on the initial contact with the calcium containing material.

Hitherto, it has been proposed to produce calcium metaphosphate by heating monocalcium phosphate to a moderate superatmospheric temperature, such as 200 to 300° C. Such a calcium metaphosphate is only partially available as plant food. A still more recent development is to treat rock phosphate with phosphorus pentoxide and thereby produce a concentrated phosphatic fertilizer containing 60 to 70% by weight of $P_2O_5$ available as plant food. This latter process generally requires a reaction temperature in the order of 1200° C. Although this temperature is not difficult to maintain, the selection and maintenance of a suitable refractory to be used at such an elevated temperature offer considerable difficulty. In my copending application, Serial No. 190,625, filed February 15, 1938, I have described and claimed one method for producing calcium metaphosphate which is available as a plant food which overcomes some of the difficulties incident to the use of the extremely high temperature required for the treatment of rock phosphate with phosphorus pentoxide and which, furthermore, makes it possible to utilize a substantial portion of existing equipment in carrying out the new procedure.

I have discovered an improvement in the process of making calcium metaphosphate which comprises mixing a calcium containing material, reactive with metaphosphoric acid to form calcium metaphosphate, and metaphosphoric acid and heating the mixture to a temperature sufficient to cause the constituents of the mixture to react and to form fused calcium metaphosphate. This improvement also includes the recovery and separation of that portion of the metaphosphoric acid in the mixture which does not react on initial contact with the calcium containing material. When the metaphosphoric acid is produced from elemental phosphorus and the calcium containing material used is rock phosphate, the improvement includes burning elemental phosphorus in a heating zone to form a hot gaseous mixture containing phosphorus pentoxide; admitting water to the hot mixture to hydrate the phosphorus pentoxide and to partially cool the mixture to the temperature required for the subsequent separation of metaphosphoric acid from the mixture; separating the metaphosphoric acid from the gaseous mixture outside the heating zone; returning the separated metaphosphoric acid to the coolest portion of the heating zone; admitting fine rock phosphate to the metaphosphoric acid so returned to the heating zone; maintaining the temperature in the heating zone so that the fine rock phosphate and a substantial portion of the metaphosphoric acid in the mixture react, form fused calcium metaphosphate and move through the heating zone countercurrent to the flow of the hot gaseous mixture; and withdrawing the fused calcium metaphosphate from the heating zone.

In the accompanying drawing which forms a part of the specification, the figure is a digrammatic, vertical, sectional view for one form of apparatus for the embodiment of my invention. Elemental phosphorus through line 2, air through line 4, and steam through line 6, are admitted into the heating zone 8, where the elemental phosphorus is oxidized to phosphorus pentoxide and the phosphorus pentoxide is hydrated to metaphosphoric acid. The hot gaseous mixture is partially cooled, that is, at least to the temperature required for the hydration of the phosphorus pentoxide and the subsequent separation of the metaphosphoric acid from the mixture, by admitting water or other suitable aqueous fluid into the heating zone through one or more of a plurality of inlets, represented by inlet 10. The cooled mixture carrying the metaphosphoric acid passes into the bottom of a packed column 12, in which the packing is supported upon a water cooled grate 14, and wherein the temperature gradient throughout is maintained such that the temperature required for the production of metaphosphoric acid prevails at the bottom of the packed column 12. A temperature above the dew point of the gaseous mixture, containing a substantial proportion of steam, is maintained at the top of the packed column 12. This temperature gradient may be maintained by admitting water or other suitable aqueous fluid through one or more of a plurality of valved inlets, represented by valved inlet 16. The liquid metaphosphoric acid which arrives at the bottom of the packed column 12, drops therefrom onto an elevated hearth 18. Fine calcium containing material, reactive with metaphosphoric acid to form calcium metaphosphate, is admitted either to that portion of the combustion chamber above the elevated hearth 18, through one or more of a plurality of inlets, represented by inlet 20, or on the elevated hearth 18, by one or more of a plurality of inlets, represented by inlet 22. The temperature in the combustion chamber is so regulated that the temperature on the elevated hearth 18, below the packed column 12, is such as to cause the calcium containing material and the metaphosphoric acid to react and form fused calcium metaphosphate. This fused calcium metaphosphate may be withdrawn from the hearth 24, or from the side or sides of the elevated hearth 18, as required, depending upon the temperature gradient maintained throughout the heating zone. The gaseous mixture which passes to the top of the packed column 12, is withdrawn through a valved line 26, to the inlet of exhauster 28, which maintains the proper pressure differential throughout the system.

One example of the operation of my process is given for producing calcium metaphosphate from rock phosphate and elemental phosphorus. The elemental phosphorus was burned with an excess of air to form a hot gaseous mixture containing phosphorus pentoxide and the phosphorus pentoxide in the hot gaseous mixture was hydrated to metaphosphoric acid and partially cooled by the admission of steam and water to the hot mixture. The partially cooled mixture was passed upwardly through a packed column, wherein the temperature at the bottom of the column was maintained at approximately 700° C., with predetermined control of excess air, excess water and gas velocity through the column. The metaphosphoric acid separated in the packed column dropped from the latter as a liquid on the elevated hearth portion of the combustion chamber below the column. Fine Tennessee brown rock phosphate, 95% through 325 mesh screen, was blown with air into the descending liquid metaphosphoric acid. A substantial portion of the rock phosphate reacted with the metaphosphoric acid and the resulting calcium metaphosphate was fused on the elevated hearth and withdrawn from the heating zone. That portion of the metaphosphoric acid which did not immediately react was volatilized, reseparated in the column and returned to the elevated hearth in contact with subsequent portions of fine rock phosphate charged.

It is evident that there are numerous factors which will influence conditions for the most satisfactory operation of my invention, the actual limits of which cannot be established except by a detailed study of each set of raw materials and the intermediate and finished products involved.

The metaphosphoric acid used is preferably produced by the oxidation of elemental phosphorus to phosphorus pentoxide, by the hydration of the phosphorus pentoxide to metaphosphoric acid, by cooling the hot gaseous mixture carrying the metaphosphoric acid, and by separating the metaphosphoric acid from such a hot gaseous mixture. Using this procedure it is quite convenient to contact the hot liquid metaphosphoric acid with fine rock phosphate rather than to carry out this same procedure with cold metaphosphoric acid followed by heating the mixture until the reaction between the rock phosphate and the metaphosphoric acid takes place and the reacting product fuses. The metaphosphoric acid used may also be prepared by the dehydration of orthophosphoric acid produced by any suitable means.

The calcium containing material used may be any such material which is reactive with metaphosphoric acid to form calcium metaphosphate. Naturally, because of its high $P_2O_5$ content, rock phosphate is preferred for this purpose. However, limestone, lime or any other readily available calcium containing material which meets the above requirements may be equally suitable, although not necessarily as economical. When rock phosphate has been used for the production of calcium metaphosphate according to my present improvement, it has been found that rock phosphate ground to such a fineness that substantially all of it passes through a 325 mesh screen reacts quite readily and apparently completely to form the calcium metaphosphate. Calcium containing coarser than 325 mesh may be used. However, under the conditions investigated, it has been found that such material, as coarse as 4 mesh, does not react with sufficient readiness to produce the smoothest operation.

The fine calcium containing material and the metaphosphoric acid may be mixed at low temperatures and subsequently heated to a temperature at which the materials react to form calcium metaphosphate, preferably followed by the fusion of the calcium metaphosphate formed. When the metaphosphoric acid is produced in the manner indicated in the above example, the fine calcium containing material, such as rock phosphate, may be admixed with the falling liquid metaphosphoric acid which drops from the packed column onto the elevated hearth at some point intermediate between the bottom of the packed column and the top of the elevated hearth beneath the column. With very fine material, this mixing is readily accomplished by blowing the fine material into this zone with a stream of air maintained at the proper pressure. When a considerably coarser suitable calcium containing material is used, such material may be admitted on the elevated hearth in such position that the falling metaphosphoric acid falls thereon, is admixed therewith and reacts to form the calcium metaphosphate.

Some of the characteristics of the reaction between rock phosphate and metaphosphoric acid are illustrated from the results obtained by heating phosphatic sand, containing 35.5% $P_2O_5$, 48.7% CaO, and 3.7% F., and metaphosphoric acid to various temperatures, with the proportion of the phosphatic sand and metaphosphoric acid such as to give a $CaO:P_2O_5$ ratio corresponding to that of calcium metaphosphate. The temperature of heating and the analysis of the respective products obtained are shown in the following table:

| Temperature, °C. | P₂O₅ | | F percent |
| --- | --- | --- | --- |
| | Total percent | Citrate insoluble percent of total | |
| 875 | 65.6 | 21.1 | 0.30 |
| 900 | 65.8 | 19.1 | 0.35 |
| 950 | 66.6 | 2.3 | 0.53 |
| 1000 | 66.5 | 1.0 | 0.44 |
| 1040 | 66.0 | 0.2 | 0.28 |

It will be observed that a substantial conversion of the rock phosphate into available P₂O₅ takes place at a temperature as low as 875° C., that at a temperature of 950° C., the conversion has been substantially completed and that at the temperature of 1040° C. the conversion may be considered as complete. It may be further observed that more than 85% of the fluorine content of the rock phosphate has been removed.

Since the reaction between the calcium containing material and the metaphosphoric acid seems to take place at a temperature which approaches the boiling point for the metaphosphoric acid, some of the latter may be volatilized, particularly when coarser calcium containing material is used. It is, therefore, desirable to provide for the reaction of that portion of the metaphosphoric acid which is volatilized when the mixture of the calcium containing material and metaphosphoric acid is heated together. This is, furthermore, conveniently accomplished in the operation of the improvement, as given in the example and illustrated in the drawing, wherein the volatilized metaphosphoric acid is merely recycled and separated as a liquid for subsequent contact with additional calcium containing material along with new metaphosphoric acid which is entering that portion of the system.

It will be seen, therefore, that this invention actually may be carried out by the use of various modifications and changes without departing from its spirit and scope, with only such limitations placed thereon as are imposed by the prior art.

I claim:

1. Process of making calcium metaphosphate from rock phosphate and metaphosphoric acid, which comprises, burning elemental phophorus in a heating zone to form a hot gaseous mixture containing phosphorus pentoxide; admitting water to the hot mixture to hydrate the phosphorus pentoxide and to partially cool the mixture to the temperature required for the subsequent separation of metaphosphoric acid from the mixture; separating the metaphosphoric acid from the gaseous mixture outside the heating zone; returning the separated metaphosphoric acid to the coolest portion of the heating zone; admitting fine rock phosphate to the metaphosphoric acid so returned to the heating zone; maintaining the temperature in the heating zone so that the fine rock phosphate and a substantial portion of the metaphosphoric acid in the mixture react, form fused calcium metaphosphate, and move through the heating zone countercurrent to the flow of the hot gaseous mixture; and withdrawing the fused calcium metaphosphate from the heating zone.

2. Process of making calcium metaphosphate from limestone and metaphosphoric acid, which comprises, burning elemental phosphorus in a heating zone to form a hot gaseous mixture containing phosphorus pentoxide; admitting water to the hot mixture to hydrate the phosphorus pentoxide and to partially cool the mixture to the temperature required for the subsequent separation of metaphosphoric acid from the mixture; separating the metaphosphoric acid from the gaseous mixture outside the heating zone; returning the separated metaphosphoric acid to the coolest portion of the heating zone; admitting limestone to the metaphosphoric acid so returned to the heating zone; maintaining the temperature in the heating zone so that the limestone and a substantial portion of the metaphosphoric acid in the mixture react, form fused calcium metaphosphate, and move through the heating zone countercurrent to the flow of the hot gaseous mixture; and withdrawing the fused calcium metaphosphate from the heating zone.

3. Process of making calcium metaphosphate from calcium containing material, reactive with metaphosphoric acid to form calcium meta-phosphate, and metaphosphoric acid, which comprises, burning elemental phosphorus in a heating zone to form a hot gaseous mixture containing phosphorus pentoxide; admitting water to the hot mixture to hydrate the phosphorus pentoxide and to partially cool the mixture to the temperature required for the subsequent separation of metaphosphoric acid from the mixture; separating the metaphosphoric acid from the gaseous mixture outside of the heating zone; returning the separated metaphosphoric acid to the coolest portion of the heating zone; admitting calcium containing material to the metaphosphoric acid so returned to the heating zone; maintaining the temperature in the heating zone so that the calcium containing material and a substantial portion of the metaphosphoric acid in the mixture react, form fused calcium metaphosphate and move through the heating zone countercurrent to the flow of the hot gaseous mixture; and withdrawing the fused calcium metaphosphate from the heating zone.

4. Process of making calcium metaphosphate from rock phosphate and metaphosphoric acid, which comprises, burning elemental phosphorus in a heating zone to form a hot gaseous mixture containing phosphorus pentoxide; hydrating the phosphorus pentoxide in the gaseous mixture to metaphosphoric acid and partially cooling the mixture to a temperature slightly above the melting point of the calcium metaphosphate subsequently formed by admitting water to the hot mixture in substantial excess of that required to hydrate the phosphorus pentoxide alone; separating the metaphosphoric acid from the gaseous mixture outside the heating zone; returning the separated metaphosphoric acid to the coolest portion of the heating zone; admitting fine rock phosphate to the metaphosphoric acid so returned to the heating zone; and maintaining the temperature in the heating zone so that the fine rock phosphate and a substantial portion of the metaphosphoric acid in the mixture react and form fused calcium metaphosphate.

5. Process of making calcium metaphosphate from limestone and metaphosphoric acid, which comprises, burning elemental phosphorus in a heating zone to form a hot gaseous mixture containing phosphorus pentoxide; hydrating the phosphorus pentoxide in the gaseous mixture to metaphosphoric acid and partially cooling the mixture to a temperature slightly above the melting point of the calcium metaphosphate subsequently formed by admitting water to the hot mixture in substantial excess of that required to hydrate the phosphorus pentoxide alone; separating the metaphosphoric acid from the gaseous mixture outside the heating zone; returning the separated metaphosphoric acid to the coolest portion of the heating zone; admitting limestone to the metaphosphoric acid so returned to the heating zone; and maintaining the temperature in the heating zone so that the limestone and a substantial portion of the metaphosphoric acid in the mixture react and form fused calcium metaphosphate.

6. Process of making calcium metaphosphate from calcium containing material, reactive with metaphosphoric acid to form calcium metaphosphate, and metaphosphoric acid, which comprises, burning elemental phosphorus in a heating zone to form a hot gaseous mixture containing phosphorus pentoxide; hydrating the phosphorus pentoxide in the gaseous mixture to metaphosphoric acid and partially cooling the mixture to a temperature slightly above the melting point of the calcium metaphosphate subsequently formed by admitting water to the hot mixture in substantial excess of that required to hydrate the phosphorus pentoxide alone; separating the metaphosphoric acid from the gaseous mixture outside of the heating zone; returning the separated metaphosphoric acid to the coolest portion of the heating zone; admitting calcium containing material to the metaphosphoric acid so returned to the heating zone; and maintaining the temperature in the heating zone so that the calcium containing material and a substantial portion of the metaphosphoric acid in the mixture react and form fused calcium metaphosphate.

7. Process of making calcium metaphosphate from rock phosphate and metaphosphoric acid, which comprises, burning elemental phosphorus in a heating zone, hydrating therein the phosphorus pentoxide formed and cooling the hot gaseous mixture to a temperature slightly above the melting point of the calcium metaphosphate subsequently formed by admitting water in substantial excess of that required to hydrate the phosphorus pentoxide alone; separating the metaphosphoric acid from the gaseous mixture outside the heating zone; returning the separated metaphosphoric acid to the heating zone; admitting fine rock phosphate to the metaphosphoric acid so returned to the heating zone; maintaining the temperature in the heating zone so that the fine rock phosphate and a substantial portion of the metaphosphoric acid in the mixture react and form fused calcium metaphosphate; and recovering that portion of the metaphosphoric acid in the mixture of fine rock phosphate and metaphosphoric acid which did not react with the fine rock phosphate and was volatilized along with the metaphosphoric acid produced by the hydration of the phosphorus pentoxide.

8. Process of making calcium metaphosphate from limestone and metaphosphoric acid, which comprises, burning elemental phosphorus in a heating zone, hydrating therein the phosphorus pentoxide formed and cooling the hot gaseous mixture to a temperature slightly above the melting point of the calcium metaphosphate subsequently formed by admitting water in substantial excess of that required to hydrate the phosphorus pentoxide alone; separating the metaphosphoric acid from the gaseous mixture outside the heating zone; returning the separated metaphosphoric acid to the heating zone; admitting limestone to the metaphosphoric acid so returned to the heating zone; maintaining the temperature in the heating zone so that the limestone and a substantial portion of the metaphosphoric acid in the mixture react and form fused calcium metaphosphate; and recovering that portion of the metaphosphoric acid in the mixture of limestone and metaphosphoric acid which did not react with the limestone and was volatilized along with the metaphosphoric acid produced by the hydration of the phosphorus pentoxide.

9. Process of making calcium metaphosphate from calcium containing material, reactive with metaphosphoric acid to form calcium metaphosphate, and metaphosphoric acid, which comprises, burning elemental phosphorus in a heating zone, hydrating therein the phosphorus pentoxide formed and cooling the hot gaseous mixture to a temperature slightly above the melting point of the calcium metaphosphate subsequently formed by admitting water in substantial excess of that required to hydrate the phosphorus pentoxide alone; separating the metaphosphoric acid from the gaseous mixture outside of the heating zone; returning the separated metaphosphoric acid to the heating zone; admitting calcium containing material to the metaphosphoric acid so returned to the heating zone; maintaining the temperature in the heating zone so that the calcium containing material and a substantial portion of the metaphosphoric acid in the mixture react and form fused calcium metaphosphate; and recovering that portion of the metaphosphoric acid in the mixture of calcium containing material and metaphosphoric acid which did not react with the calcium containing material and was volatilized along with the metaphosphoric acid produced by the hydration of the phosphorus pentoxide.

10. Process of making calcium metaphosphate from rock phosphate and metaphosphoric acid, which comprises, forming a hot gaseous mixture containing metaphosphoric acid in a heating zone in which the lowest temperature is slightly above the melting point of the calcium metaphosphate subsequently formed; separating the metaphosphoric acid from the gaseous mixture outside of the heating zone; returning the separated metaphosphoric acid to the heating zone; admitting rock phosphate to the metaphosphoric acid so returned to the heating zone; and maintaining the temperature in the heating zone so that the rock phosphate and the metaphosphoric acid react and form fused calcium metaphosphate.

11. Process of making calcium metaphosphate from limestone and metaphosphoric acid, which comprises, forming a hot gaseous mixture containing metaphosphoric acid in a heating zone in which the lowest temperature is slightly above the melting point of the calcium metaphosphate subsequently formed; separating the metaphosphoric acid from the gaseous mixture outside of the heating zone; returning the separated metaphosphoric acid to the heating zone; admitting limestone to the metaphosphoric acid so returned to the heating zone; and maintaining the temperature in the heating zone so that the limestone and the metaphosphoric acid react and form fused calcium metaphosphate.

12. Process of making calcium metaphosphate from calcium containing material, reactive with metaphosphoric acid to form calcium metaphosphate, and metaphosphoric acid, which comprises, forming a hot gaseous mixture containing metaphosphoric acid in a heating zone in which the lowest temperature is slightly above the melting point of the calcium metaphosphate subsequently formed; separating the metaphosphoric acid from the gaseous mixture outside of the heating zone; returning the separated metaphosphoric acid to the heating zone; admitting calcium containing material to the metaphosphoric acid so returned to the heating zone; and maintaining the temperature in the heating zone so that the calcium containing material and the metaphosphoric acid react and form fused calcium metaphosphate.

13. Continuous process of making calcium metaphosphate from rock phosphate and liquid metaphosphoric acid, which comprises, mixing rock phosphate and metaphosphoric acid; heating the mixture to a temperature sufficient to cause the constituents of the mixture to react and to form fused calcium metaphosphate; and recovering and returning to the reaction zone that portion of the metaphosphoric acid which does not initially react with the rock phosphate and is volatilized.

14. Continuous process of making calcium metaphosphate from calcium containing material, reactive with metaphosphoric acid to form calcium metaphosphate, and liquid metaphosphoric acid, which comprises, mixing calcium containing material and metaphosphoric acid; heating the mixture to a temperature sufficient to cause the constituents of the mixture to react and to form fused calcium metaphosphate; and recovering and returning to the reaction zone that portion of the metaphosphoric acid which does not initially react with the calcium containing material and is volatilized.

HARRY A. CURTIS.